United States Patent [19]

Derbyshire

[11] 4,067,587
[45] Jan. 10, 1978

[54] DRILL CHUCKS

[75] Inventor: George Cecil Derbyshire, Sheffield, England

[73] Assignee: The Jacobs Manufacturing Company, Limited, Sheffield, England

[21] Appl. No.: 664,946

[22] Filed: Mar. 8, 1976

[30] Foreign Application Priority Data

Apr. 1, 1975 United Kingdom ............... 13275/75

[51] Int. Cl.² ............................................. B23B 31/04
[52] U.S. Cl. .................................... 279/62; 279/1 ME
[58] Field of Search ............... 279/1 K, 1 ME, 60, 61, 279/62, 64; 403/261, 326; 220/306

[56] References Cited

U.S. PATENT DOCUMENTS

| | | | |
|---|---|---|---|
| 2,498,590 | 2/1950 | Straus | 403/326 X |
| 2,974,825 | 3/1961 | Ross | 220/306 |
| 3,462,164 | 8/1969 | Wightman | 279/62 |
| 3,810,642 | 5/1974 | Derbyshire | 279/62 |

Primary Examiner—Z. R. Bilinsky
Attorney, Agent, or Firm—Stephen J. Rudy

[57] ABSTRACT

A drill chuck of the angularly sliding jaw type including a jaw actuating nut and a sleeve associated with the nut mounted on the body of the chuck, various forms of abutment means being provided for retaining the sleeve in its required position relative to the nut.

3 Claims, 6 Drawing Figures

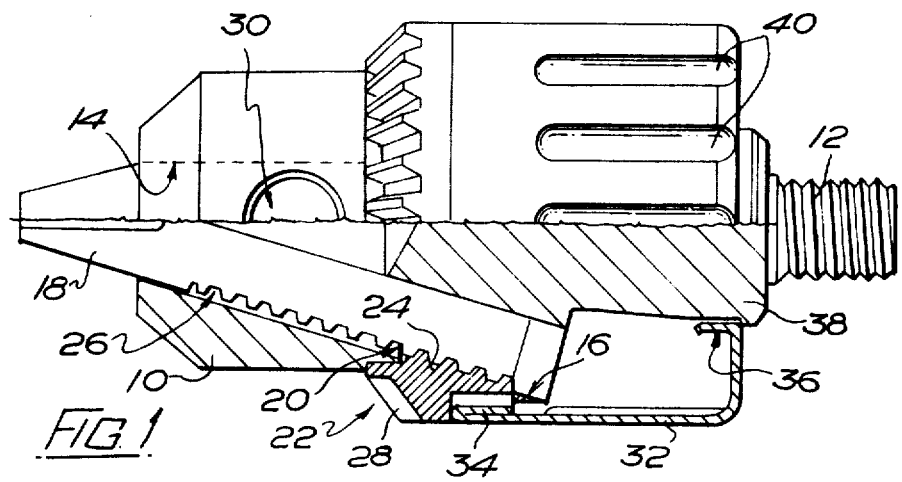
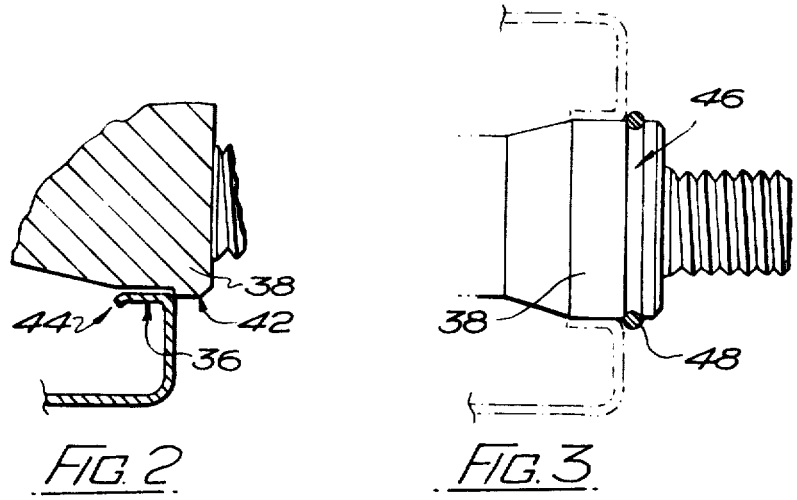

DRILL CHUCKS

BACKGROUND OF THE INVENTION

The invention relates to drill chucks and has for its object to provide an improvement therein. In particular, the invention relates to an improvement in or modification of the invention claimed in my prior U.S. Pat. No. 3,810,642.

According to the invention, there is provided an improvement in or modification of the invention claimed in my prior U.S. Pat. No. 3,810,642, that is to say a drill chuck provided with a body part in which jaws are slidably mounted for converging movement in respective bores; a nut member rotatably mounted on the body part but axially located in a circumferential groove encircling said body part, said nut member having screwthreaded engagement with said jaws for advancing said jaws through a forward portion of the body part to grip a drill shank, and for retracting said jaws; a gear element with which the teeth of an extraneous chuck key may be engaged to tighten or slacken the jaws; and a cylindrical or generally cylindrical sleeve formed separately from but connected to said nut member and extending rearwardly of the body part to rotatably engage a cylindrical portion of the body part remote from the nut member, the improvement or modification residing in the fact that abutment means are provided, acting between the cylindrical sleeve and the portion of the body part with which it is rotatably engaged, for holding said sleeve in its required position in relation to the nut member. The abutment means may be constituted by a shoulder formed integrally on the portion of the body part with which the cylindrical sleeve is rotatably engaged and over which a part of the sleeve which forms a bearing surface between the sleeve and body part will have been pressed to take up its required position. The sleeve will preferably have been made as a pressing from metal plate and in this case a part of the sleeve which forms a bearing surface between the sleeve and body part will preferably be constituted by a flange portion extending concentrically within the cylindrical or generally cylindrical shape of the sleeve. In this case also, a free edge of the flange will preferably be provided with a slight outward flare to facilitate assembly of the chuck, that is to say to facilitate the pressing of the flange portion of the sleeve over the portion of the body part providing the shoulder. On the other hand, the abutment means may be constituted by a self-locking ring pressed onto the portion of the body part with which the cylindrical sleeve is rotatably engaged, to abut against the end of said sleeve, the self-locking ring having radially inwardly projecting resilient fingers arranged to bite into the surface of the portion of the body part referred to, and in this case the portion of the body part with which the cylindrical sleeve is rotatably engaged may be circumferentially grooved for the reception of the radially inner ends of the resilient fingers of the self-locking ring. In this case also, an end wall of the sleeve against which the self-locking ring abuts may be recessed to accommodate said ring. Alternatively, in a case in which the sleeve has been made as a pressing from metal plate, the abutment means may be constituted by a plurality of tabs formed integrally with said sleeve to form radially inwardly projecting resilient fingers engaging a circumferential groove formed in the portion of the body part with which the sleeve is rotatably engaged. A still further possibility is that the abutment means may be constituted by a resilient split ring entered into a groove in the body part after the chuck has been assembled normally.

BRIEF DESCRIPTION OF THE DRAWING

In order that the invention may be fully understood and readily carried into effect, the same will now be described, by way of example only, with reference to the accompanying drawings, of which:

FIG. 1 is a side view, partly in longitudinal section, of a drill chuck embodying the invention;

FIG. 2 is a scrap view showing a detail of the chuck to a somewhat enlarged scale; and FIGS. 3 to 6 are scrap views which illustrate possible modifications.

Referring now to FIG. 1 of the drawings, the drill chuck there illustrated includes a body part 10 having at one end a screwthreaded spigot portion 12 for connection to a power tool driving spindle (not shown) and at its other end an axially extending bore 14 for the reception of a drill shank (not shown). Three equally spaced bores 16, only one of which is shown in the drawings, diverge from the axially extending bore for the reception of respective jaws 18, the jaws being slidably mounted in the bores 16 so that as they are advanced they converge to grip a drill shank between parallel end portions and when they are retracted into the body part they release the shank.

Figure 4:
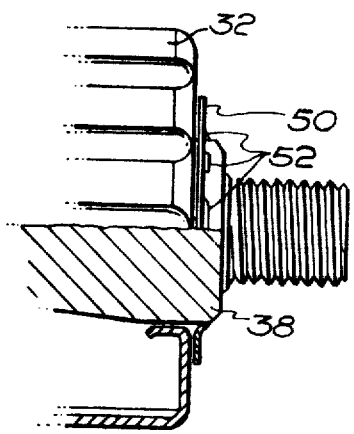

A circumferential groove 20 extends around the body part intermediate the ends of the latter and breaks into the bores 16. An integral nut and bevel gear element generally indicated 22, formed in halves, engages the groove so that the nut portion 24 thereof, which is formed with a tapering internal screwthread, has threaded engagement with thread elements 26 of the jaws 18. The bevel gear portion 28 of the element 22 surrounds a cylindrical portion of the body part in which three equally spaced radial blind bores 30 are formed, said blind bores being provided for the reception of a pilot end of an extraneous chuck key (not shown) having a bevel pinion capable of engaging the teeth of the bevel gear portion 28. In this way, the chuck jaws can be simultaneously advanced or retracted, as required, in known manner.

The integral nut and bevel gear element 22, which as previously stated is in halves, is axially located by its engagement in the groove 20 and is held together by a cylindrical sleeve 32 made as a pressing from a relatively light gauge metal plate, substantial strength having been imparted thereto at an end which encircles the element 22 by forming the sleeve with a completely inturned edge 34. The integral nut and bevel gear element is stepped for the reception of the strengthened end of the sleeve, as shown, and the outside diameter of that end of the sleeve is the same as that of the outside diameter of the bevel gear portion of the element 22. The end of the sleeve remote from the integral nut and bevel gear element is completely inturned to form a flange 36 which extends concentrically within the generally cylindrical shape of the sleeve, said flange forming a bearing surface and engaging a cylindrical portion 38 of the body part adjacent the screw-threaded spigot portion 12. In addition, the metal sleeve has been formed with a series of flutes 40 which further strengthen the light gauge wall of said sleeve and also provide a convenient gripping surface for the user's hand when he requires to make manual adjustments.

Abutment means are provided, acting between the cylindrical sleeve and the cylindrical portion 38 of the body part with which it is rotatably engaged, for holding the sleeve in its required position in relation to the nut member, that is to say with its inturned strengthened edge extending fully along the stepped portion of the integral nut and bevel gear element so that its halves are tightly held together. As best shown in FIG. 2, said abutment means are constituted by a shoulder formed by an enlarged integral end portion 42 of the portion 38 of the body part and over which the flange 36 of the sleeve has been pressed during the assembly of the chuck to take up its required position. The flange 36 is of course able to rotate freely on the portion 38 of the body part which it encircles in FIG. 1 and slight radial clearance is formed there, but the flange 36 is an interference fit on the enlarged end portion 42. For this reason the free edge of the flange 36 is shown to have a slight outward flare at 44 to facilitate assembly.

Thus there is provided a drill chuck which by virtue of its construction is somewhat cheaper to produce than similar chucks of conventional construction. It has also been found that the provision of the abutment means acting between the cylindrical sleeve and the cylindrical portion of the body part has very securely held the sleeve in its required position in relation to the nut member, so much so that the chuck has been able to be used for impact drilling. The vibration produced has been unable to displace the sleeve from its position encircling the halves of the integral nut and bevel gear element so that the latter has been very safely and securely held together.

Referring now to FIG. 3, in a modification of the chuck described above, the portion 38 of the body part has been provided with a circumferential groove 46 instead of the enlarged end portion 42 and a resilient split ring 48 is provided for snap fitting in said groove. In this case the chuck can be assembled in normal manner and the ring can then be snapped into position to form an alternative abutment means against possible displacement of the sleeve away from the nut member even when the chuck is used for impact drilling. Of course it will be understood that the resilient split ring 48 can have various cross sectional shapes, the only requirement being that when snapped into position in its groove in the body part it must be capable of constituting an abutment means able to resist displacement of the sleeve away from the nut member when impact drilling.

Referring now to FIG. 4, in another possible modification of the chuck described with reference to FIGS. 1 and 2 the portion 38 of the body part is made plain and the abutment means are constituted by a self-locking ring 50 pressed onto the portion 38 to abut against the end of the sleeve 32. The self-locking ring has a plurality of radially inwardly projecting resilient fingers 52 which are an interference fit on the portion 38 of the body part so that having been deflected so that they can pass along the body part they are arranged to bite into the surface of said portion of the body part under the influence of any force tending to displace the ring.

Figure 5:
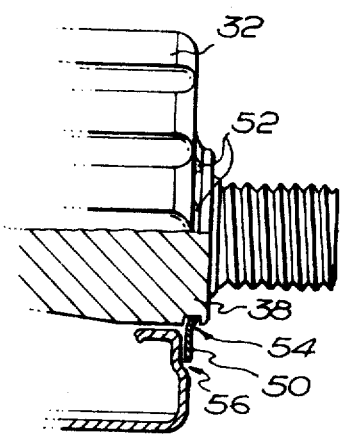

In FIG. 5 there is illustrated a modification of the arrangement just described wherein the portion 38 of the body part is shown to have been circumferentially grooved at 54 for the reception of the radially inner ends of the resilient fingers 52 of the self-locking ring 50. In addition it will be seen that the end wall of the sleeve against which the self-locking ring abuts is recessed at 56 to accommodate said ring.

Figure 6:
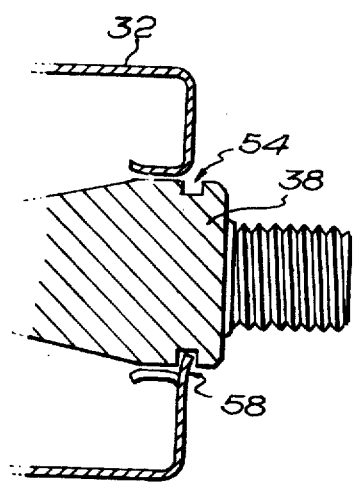

Referring now to FIG. 6, in a further possible modification the abutment means are constituted by three equally spaced tabs 58 (only one of which is shown in the drawing) which have been formed as shown, integrally with the sleeve, to form radially inwardly projecting resilient fingers engaging a circumferential groove 54 in the portion 38 of the body part with which the sleeve is rotatably engaged. The flange portion which extends concentrically within the generally cylindrical shape of the sleeve and which forms a bearing surface between the sleeve and the body part is of course thereby "gapped" at three equally spaced points but this does not seriously weaken the sleeve.

Various other modifications may be made to the chuck just described. For example, the body part of a chuck embodying the invention may be adapted for connection to any kind of power tool driving spindle, that is to say, for example, it may be provided with an internally screwthreaded recess instead of the screwthreaded spigot portion 12. It will also be understood that although by way of example the nut and bevel gear element are shown in FIG. 1 as having been formed integrally together this is not essential and they could quite well have been formed separately (as shown for example in FIG. 2 of said U.S. Pat. No. 3,810,642. In this case of course although the nut member will still be made in halves the gear element can be made as an unbroken ring and can be used to hold the halves of the nut member tightly together (and consequently it will not be as necessary for that end of the cylindrical or generally cylindrical sleeve to be very strong). Similarly, except in the case of the chuck illustrated in FIG. 6, it is not essential that the sleeve 32 should be made as a pressing from metal plate. On the contrary it could be made of a synthetic plastics material also as described in said U.S. Pat. No. 3,810,642 but in this case, if the nut member and gear element are formed integrally together the sleeve will need to be provided with a metal reinforcing member to strengthen it at its end which is to encircle the halves of the integrally formed nut and bevel gear element.

I claim:

1. An improvement comprising a drill chuck provided with a body part having a formed portion in which jaws are slidably mounted for converging movement in respective bores and a cylindrical rear portions; a circumferential groove encircling said body part between said forward and rear portions, a nut member rotatably mounted on the body part and axially located in the circumferential groove, said nut member having screw threads for engagement with threads on said jaws for advancing said jaws through a forward portion of the body part to grip a drill shank, and for retracting said jaws; a gear element formed on the nut member with which the teeth of an extraneous chuck key may be engaged to rotate said nut member with respect to the body to tighten or slacken the jaws; and a cylindrical sleeve and partially encompassing connected to said nut member and extending rearwardly of the body part and having a radially internal flange portion to rotatably engage said cylindrical portion of the body part remote from the nut member, the improvement comprising abutment means on said cylindrical rear portion and acting between the cylindrical sleeve flange portion and the portion of the body part with which it is rotatably engaged, for holding said sleeve in its required position in relation to the nut member, said abutment means being formed by a shoulder means encircling the body part in the region supporting an end of the cylindrical sleeve, the internal diameter of said flange portion being less than the diameter of said abutment whereby the sleeve is press fitted over said abutment into engagement with said nut member.

2. A drill chuck according to claim 1, in which the sleeve has been made as a pressing from metal plate and a part of the sleeve which forms a bearing surface between the sleeve and body part is constituted by said flange portion extending concentrically within the cylindrical shape of the sleeve.

3. A drill chuck according to claim 2, in which a free edge of the flange portion is provided with a slight outward flare to facilitate assembly of the chuck, that is to say to facilitate the pressing of the flange portion of the sleeve over the portion of the body part providing the shoulder.

* * * * *